United States Patent
Buie et al.

(10) Patent No.: US 8,469,421 B2
(45) Date of Patent: Jun. 25, 2013

(54) SAFETY LATCHING LIFTING HOOK

(75) Inventors: Garry Alan Buie, Hobbs, NM (US); Billy Ray Ganaway, Hobbs, NM (US); Garry Anthony Wilson, Hobbs, NM (US)

(73) Assignee: PEMCO of New Mexico, Inc., Hobbs, NM (US)

( * ) Notice: Subject to any disclaimer, the term of this patent is extended or adjusted under 35 U.S.C. 154(b) by 0 days.

(21) Appl. No.: 12/964,732

(22) Filed: Dec. 9, 2010

(65) Prior Publication Data

US 2011/0175385 A1 Jul. 21, 2011

Related U.S. Application Data

(60) Provisional application No. 61/336,331, filed on Jan. 21, 2010.

(51) Int. Cl.
*B66C 1/36* (2006.01)

(52) U.S. Cl.
USPC .............. 294/82.2; 394/82.19; 24/600.1

(58) Field of Classification Search
USPC .... 294/175, 82.1, 82.19, 82.2, 191; 24/599.1, 24/599.4, 600.1
See application file for complete search history.

(56) References Cited

U.S. PATENT DOCUMENTS

| | | | | |
|---|---|---|---|---|
| 621,295 A * | 3/1899 | Curtis | | 294/82.2 |
| 1,193,516 A * | 8/1916 | Clarke | | 294/82.2 |
| 1,546,208 A * | 7/1925 | Cunningham | | 294/82.2 |
| 1,573,444 A * | 2/1926 | Jordan | | 294/82.2 |
| 1,626,865 A * | 5/1927 | Neilson | | 294/82.2 |
| 1,669,418 A * | 5/1928 | Lemex | | 294/82.2 |
| 1,682,617 A * | 8/1928 | Jensen et al. | | 294/82.2 |
| 1,711,440 A * | 4/1929 | Baker | | 294/82.2 |
| 1,747,128 A * | 2/1930 | O'Bannon | | 294/82.2 |
| 2,705,357 A * | 4/1955 | Davick | | 294/82.2 |

* cited by examiner

*Primary Examiner* — Dean Kramer
(74) *Attorney, Agent, or Firm* — Roman Aguilera, III

(57) ABSTRACT

The invention relates to a novel hook design which provides additional safety features to reduce the potential for accidents and provides additional protection to the operator. The invention may be applied to overhead hoist hooks, chain hooks, wire line hooks, and many other hooks. The safety design features include a spring activated trigger and latch mechanism, a latch stop, a trigger guard, and a trigger lock mechanism which may or may not utilize a spring to activate it. The safety latching lifting hook provides for ease of connection (hooking) and ease of release (unhooking) with a trigger guard to protect the operator's hand and the trigger latch mechanism.

9 Claims, 11 Drawing Sheets

SAFETY LATCHING LIFTING HOOK

CROSS-REFERENCE TO RELATED APPLICATIONS

This application claims the benefit under Title 35 United States Code §119(e) of U.S. Provisional Patent Application Ser. No. 61/336,331; Filed: Jan. 21, 2010, the full disclosure of which is incorporated herein by reference.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATING-BY-REFERENCE OF MATERIAL SUBMITTED ON A COMPACT DISC

Not applicable

SEQUENCE LISTING

Not applicable

FIELD OF THE INVENTION

The present invention relates to lifting hook devices. More specifically, the present invention relates to hooking devices used for lifting tubes and pipes and by extension the application may be extended to many types of hooking devices.

BACKGROUND OF THE INVENTION

Without limiting the scope of the disclosed invention, the background is described in connection with a novel hook device used for lifting tubes and pipes.

The invention primarily falls within Group Art Unit 3652, Patent Class 294 (Handling: Hand and Hoist-Line Implements) and Sub Classes 82.11 (Hoist-Line or Grab Hook: Cable and Hook Tackle), 82.17 (Hoist-Line Or Grab Hook: Locking Device (i.e. Hook Throat Closure), and 82.24 (Hoist-Line or Grab Hook: Load Releasing Means), but is not limited to the aforementioned primary group art unit number, or the patent class, or the sub classes. The safety latching mechanism can be applied to: oilfield related tubing pipe hooks (as highlighted in this application), overhead hoist hooks, winch line hooks, chain hooks, tie down strap hooks, support hooks, and many more attachment devices.

The invention's design and development is a direct result of a customer requesting an improved tubing/pipe lifting device for use on their well service rig. Tubing lifting hooks in the past were often made from a metal rod bent in a 'J' shape with a connector on the top of the T to attach to a wire line which raised and lowered the pipe hook and the pipe. The pipe hook which we used for reference in our design was cut out of 1¼ inch steel plate shaped as an elongated T with a hole at the top of the 'J' for the wire line to attach to. A sheet metal cap which slipped over the opening of the bottom of the T helped to retain the pipe in the hook. The metal cap which was formed around the upper section or handle was manually moved up to allow the pipe to be removed and lowered to retain the pipe. The metal cap had to be manually held up to keep it from falling and covering the hook opening when loading and unloading the pipe. Our design focused on providing a safe and easy to operate tool for picking up and laying down pipe. We extended the throat of the pipe hook which made it appear more like an inverted question mark '¿' than a 'J', which also kept the center of gravity aligned with the handle of the pipe hook and the attachment hole (eye). Then we added a peninsula above the hook opening to protect the operator's hand which resulted in further encasing the pipe resting area. We added a latch to retain the pipe within the hook area and then developed the trigger to retract the latch which allows the pipe to be removed from the hook area. The spring activated trigger and latch mechanism allows the pipe to be quickly hooked without having to press the trigger and then to safely unhook the pipe by pressing the trigger which retracts the latch. Finally a trigger guard was added to the design to protect the operator's hand and to protect the trigger from being hit accidentally which could release the pipe from the hook. Thus the present invention proposes a novel lifting hook device which is utilized in the lifting of tubes and pipes.

BRIEF SUMMARY OF THE INVENTION

The present invention, therefore, provides a mechanical device used in hooking and unhooking tubes and pipes. This is the first effective safety latching lifting hook. Current lifting hook strategies have had only limited success. Thus, there remains a critical need for the development of alternate approaches to a lifting hook device.

The safety latching lifting hook was originally designed and developed to provide the safest and easiest means of picking up and laying down tubing pipe for the well service industry. The design can readily be applied to other 'hooking' devices to provide the safety features developed specifically for the safety latching lifting pipe hook. The design of the elongated and enclosed 'hook area' increases the safety factor by affording additional protection for the operator's hand and acts as a constrained entrance and exit path for the pipe. The 'hook area' or pipe rest area has its center of gravity directly below and aligned with the pipe hook handle, which assists in keeping the pipe from swinging back into the operator. The spring loaded latch allows the pipe to be 'hooked' or loaded into the pipe hook without having to press the trigger to retract the latch or to release the trigger to release the latch. When loading the hook, the pipe pushes the latch back into the latch's recessed pocket allowing the pipe to move into the 'hook area', then the latch springs back against the latch stop securing the pipe within the hook. The typical hook with a spring activated latch (most commonly used on overhead hoist hooks) allows the lifting cable (chain, lifting straps, etc) to push the latch out of the way allowing the cable to move into the hook area. The spring activated latch then returns to rest against the hook stop. The operator's fingers have to manually move the spring activated latch out of the way and hold the latch until the cable is removed, which keeps the operator's fingers and hand(s) in harms way when unhooking. The Safety Latching Lifting Hook trigger mechanism was designed and developed to keep the operator's hand(s) away from the cable (pipe) and out of harms way. When the trigger is pulled towards the operator the latch is forced away from the latch stop and into its recessed pocket which allows the cable (pipe) to be safely removed thereby protecting the operator's hand. The trigger guard provides additional safety by keeping the cable (pipe) away from the operator's hand and also acts as a slide guide when loading and unloading the cable (pipe) into the hook. The trigger guard also protects the trigger from being hit accidentally, which would force the latch to open and potentially allow the load to be released from the hook prematurely.

Although the safety latching lifting hook was originally designed as a safety pipehook, the design can be incorporated into any open faced hook, thereby providing the same safety benefits of the safety latching lifting hook to other hooks. The safety latching mechanism when designed and incorporated as part of a chain hook, provides additional safety by not allowing the chain to slip out of the hook if slack in the chain is accidentally encountered as the load is raised, lowered or transported. The hooked chain can be released by pressing the trigger which keeps the operator's fingers out of harms way. The same safety benefits apply to any hook which is normally open faced, whether it is used with or without a spring latch. Another example would be for the ratchet tie down straps to have the safety latching mechanism incorporated into the tie down hook which would keep the strap attached to the tie down point, if the straps loosened while in transit.

In summary, the present invention discloses a mechanical hook device for use in lifting tubing and pipes.

BRIEF DESCRIPTION OF THE SEVERAL VIEWS OF THE DRAWINGS

For a more complete understanding of the features and advantages of the present invention, reference is now made to the detailed description of the invention along with the accompanying figures in which.

DETAILED DESCRIPTION OF THE INVENTION

Disclosed herein is a mechanical hook device. The numerous innovative teachings of the present invention will be described with particular reference to several embodiments (by way of example, and not of limitation).

Figure 1:
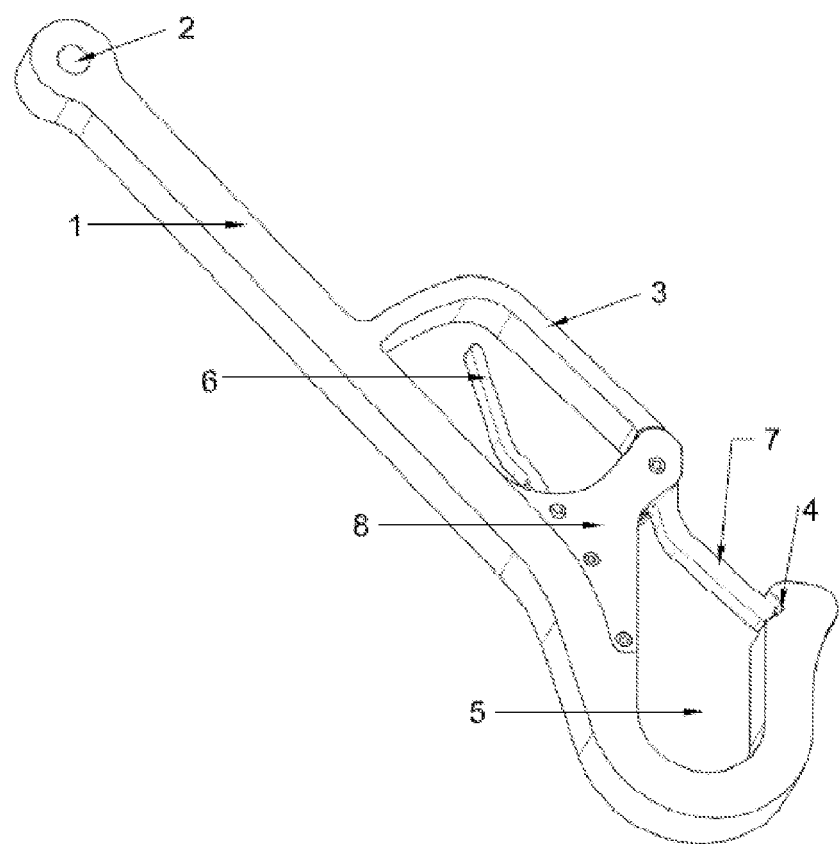
FIG. 1 is a depiction of the safety latching lifting hook design as applied to the pipe hook in accordance with embodiments of the disclosure.

The hook type assembly in accordance with the present disclosure is shown in FIG. 1 and represents the pipe hook design with the main body 1 currently being cut out of a steel plate. A wire rope line is connected to the pipe hook at the attachment point 2 with a clevis or other attachment means. The wire rope line is utilized to raise, lower and transport the pipe to its required position. The hook design provides for the latch 7 to be held against the hook stop 4 by a torsion spring which keeps the pipe secured in the hook area 5 which is pipe size specific. The trigger 6 retracts the latch 7 allowing the pipe to be loaded (hooked) into the hook area 5, or to be released (unhooked) from the hook area 5. The trigger 6 is protected by the trigger guard 3 which also protects the operator's hand. The trigger 6 and latch 7 mechanism is protected by the cover plate 8 which is used in current manufacturing procedures. The trigger 6 and latch 7 are held in place by shoulder bolts countersunk into the cover plate 8 which is held in place by machine bolts countersunk into the cover plate 8.

Figure 2:
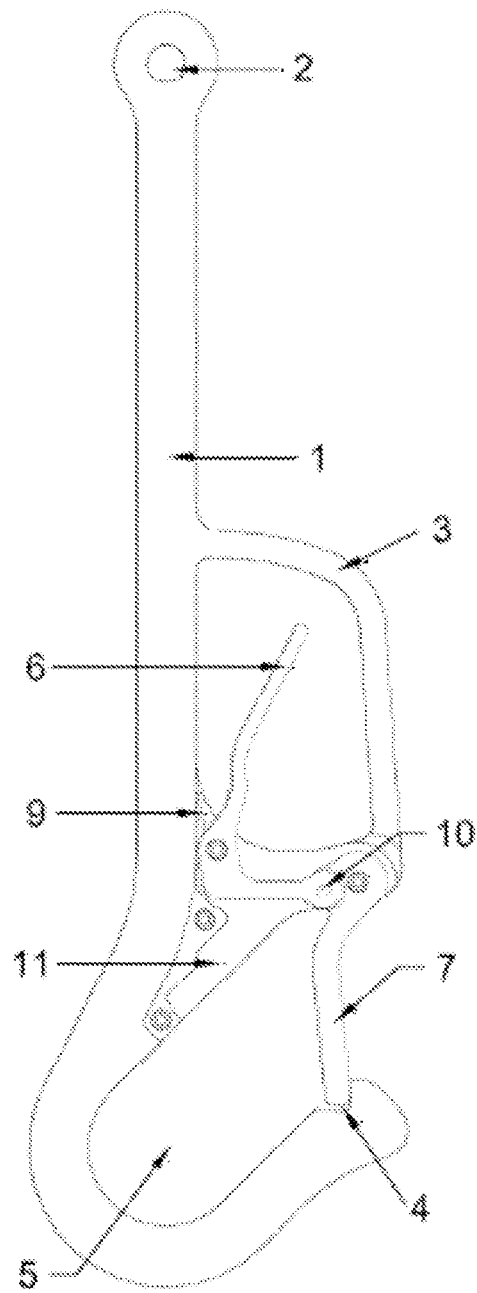
FIG. 2 is a depiction of the safety latching lifting pipe hook and its key features in the closed position with the cover plate removed for clarity in accordance with embodiments of the disclosure.

Reference will now be made to FIG. 2 in which the cover plate 8 (reference FIG. 1) has been removed for clarity and shows the main body 1 with the trigger guard 3, the attachment point 2, and the latch stop 4 all incorporated into the main body 1. The hook area 5 is design specific for the pipe size with the center of gravity being centered along the main body 1 and the attachment point 2. The latch 7 and the trigger 6 are held in place by shoulder bolts and are shown in the closed position. A torsion spring 9 is recessed into the trigger 6 and is held in place by the same shoulder bolt securing the trigger 6. The torsion spring 9 keeps pressure on the trigger 6 and the latch 7 which are connected together by the pivot pin 10 which moves freely below the cover plate. A latch recess pocket 11 allows the latch 7 to be fully refracted out of the way when the pipe is being loaded or unloaded from the hook area 5.

Figure 3:
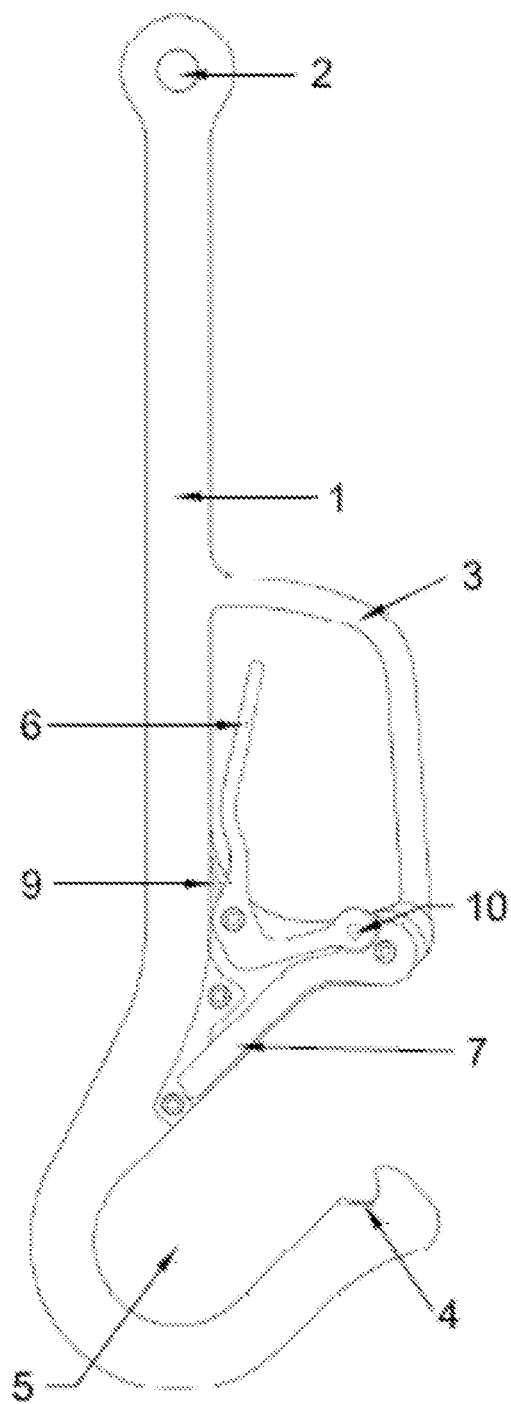
FIG. 3 is a depiction of the safety latching lifting pipe hook and its key features in the open or 'hooking' position with the cover plate removed for clarity in accordance with embodiments of the disclosure.

Reference will now be made to FIG. 3 in which the cover plate 8 (reference FIG. 1) has been removed for clarity and shows the main body 1 with the trigger guard 3, the attachment point 2, and the latch stop 4 all incorporated into the main body 1. The hook area 5 is design specific for the pipe size with the center of gravity being centered along the main body 1 and the attachment point 2. The latch 7 and the trigger 6 are held in place by shoulder bolts and are shown in the open position. A torsion spring 9 is recessed into the trigger 6 and is held in place by the same shoulder bolt securing trigger 6. The torsion spring 9 applies pressure on the trigger 6 and the latch 7 which are connected together by the pivot pin 10 which moves freely below the cover plate. A latch recess pocket 11 allows the latch 7 to be fully retracted out of the way when the pipe is being loaded or unloaded from the hook area 5. FIG. 3 shows the latch 7 retracted into the latch recess pocket 11, which can be accomplished by either pulling the trigger 6 which applies pressure to the pivot pin 10, which in turn applies pressure to the latch 7 which retracts the latch into the latch recess pocket 11 or by pushing the pipe against the latch 7 which forces the latch into the latch recess pocket 11.

Figure 4:
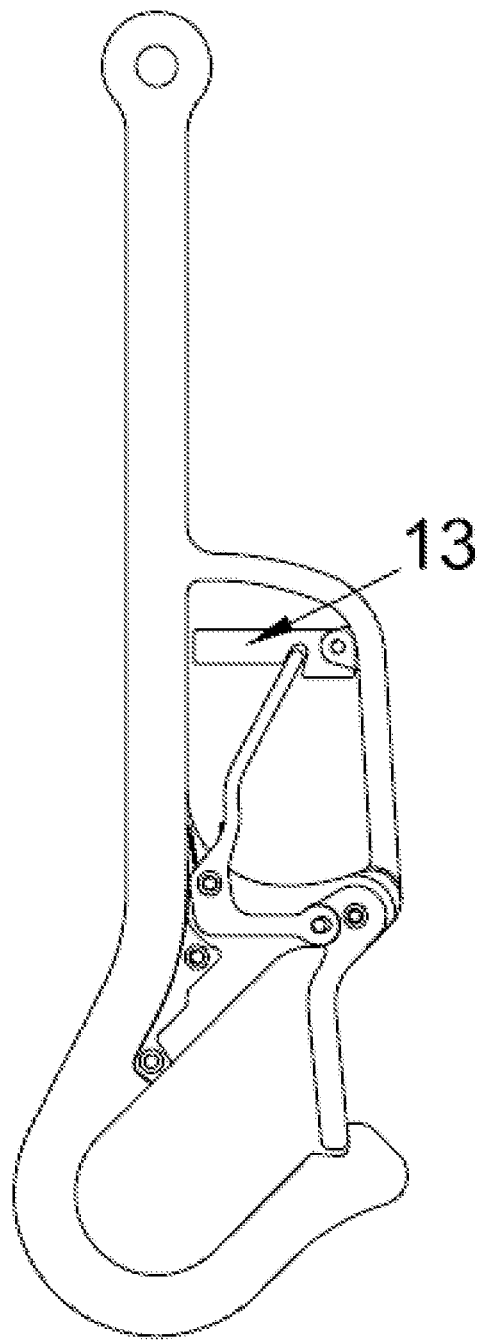
FIG. 4 is a depiction of the safety latching lifting pipe hook with an additional spring loaded locking mechanism to prevent the latch from moving freely in accordance with embodiments of the disclosure.

Reference is now made to FIG. 4 which shows the pipe hook with the additional trigger lock mechanism 13 which prevents the trigger from moving out of the closed position and prevents the latch from being forced open by an external force. The trigger lock mechanism 13 can be implemented with a torsion spring to keep constant pressure on the trigger or simply utilize the weight of the trigger lock mechanism 13 to hold the trigger.

Figure 5:
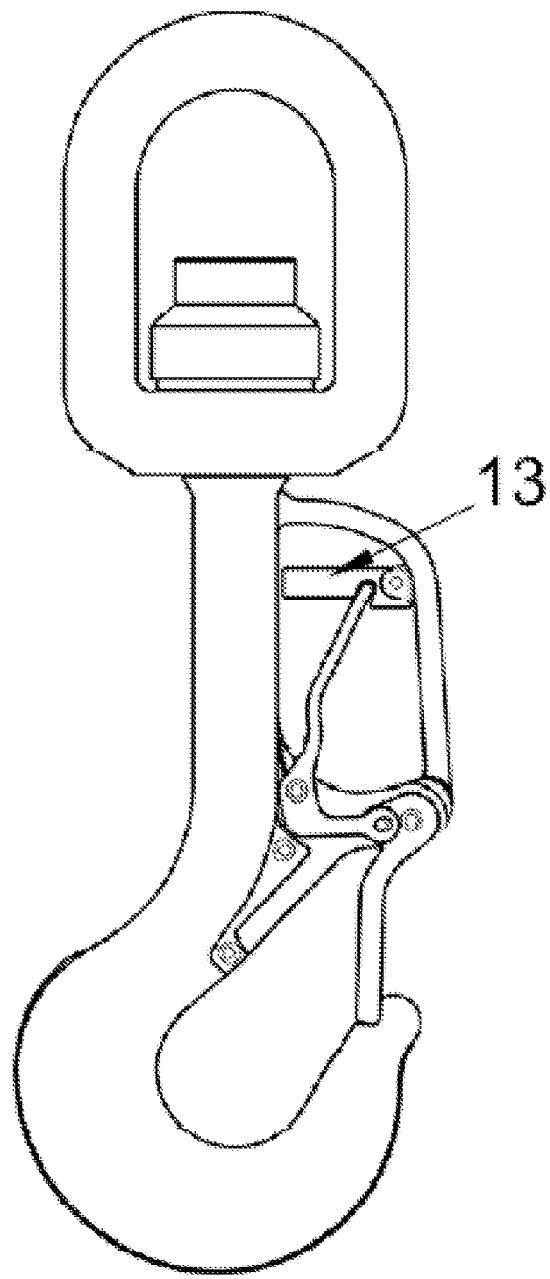
FIG. 5 is a depiction of the safety latching lifting hook design implemented into an overhead hoist hook with the additional spring loaded locking mechanism in accordance with embodiments of the disclosure.

Reference is now made to FIG. 5 which depicts an embodiment for implementing the invention in an overhead hoist-line hook with the additional trigger lock mechanism 13. The length of the trigger can be shortened to reduce the overall length of the overhead hoist-line hook.

Figure 6:
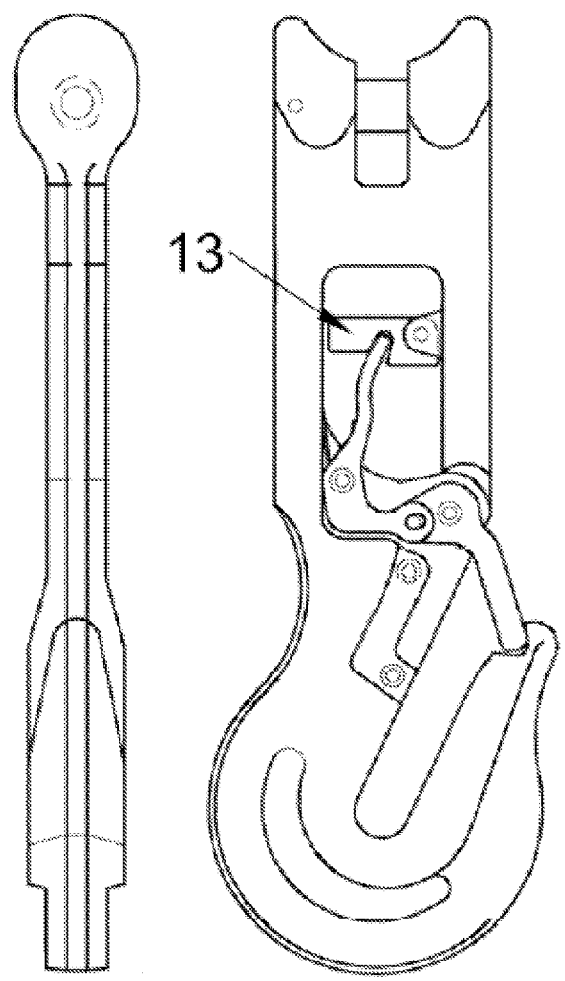
FIG. 6 is a depiction of the safety latching lifting hook design implemented into a chain hook with the additional spring loaded locking mechanism in accordance with embodiments of the disclosure.

Reference is now made to FIG. 6 which depicts an embodiment for implementing the invention in a chain hook with the additional trigger lock mechanism 13. The trigger and latch mechanism have both been shortened in this drawing which requires one or two fingers to operate the trigger lock mechanism 13 and the trigger 6 with one hand.

Figure 7:
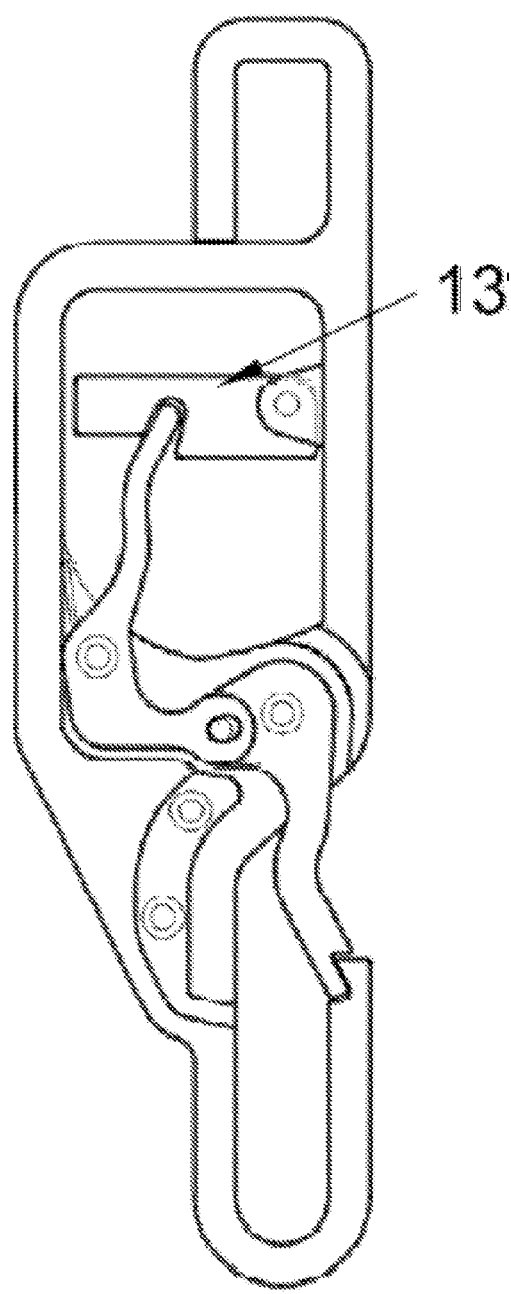
FIG. 7 is a depiction of the safety latching lifting hook design implemented into a ratchet style strap hook with the additional spring loaded locking mechanism in accordance with embodiments of the disclosure.

Reference is next made to FIG. 7 which depicts an embodiment for implementing the invention for a ratchet style strap hook with the additional trigger lock mechanism 13. The trigger and latch mechanism have both been shortened in this drawing which requires one or two fingers to operate the trigger lock mechanism 13 and the trigger 6 with one hand.

Figure 8:
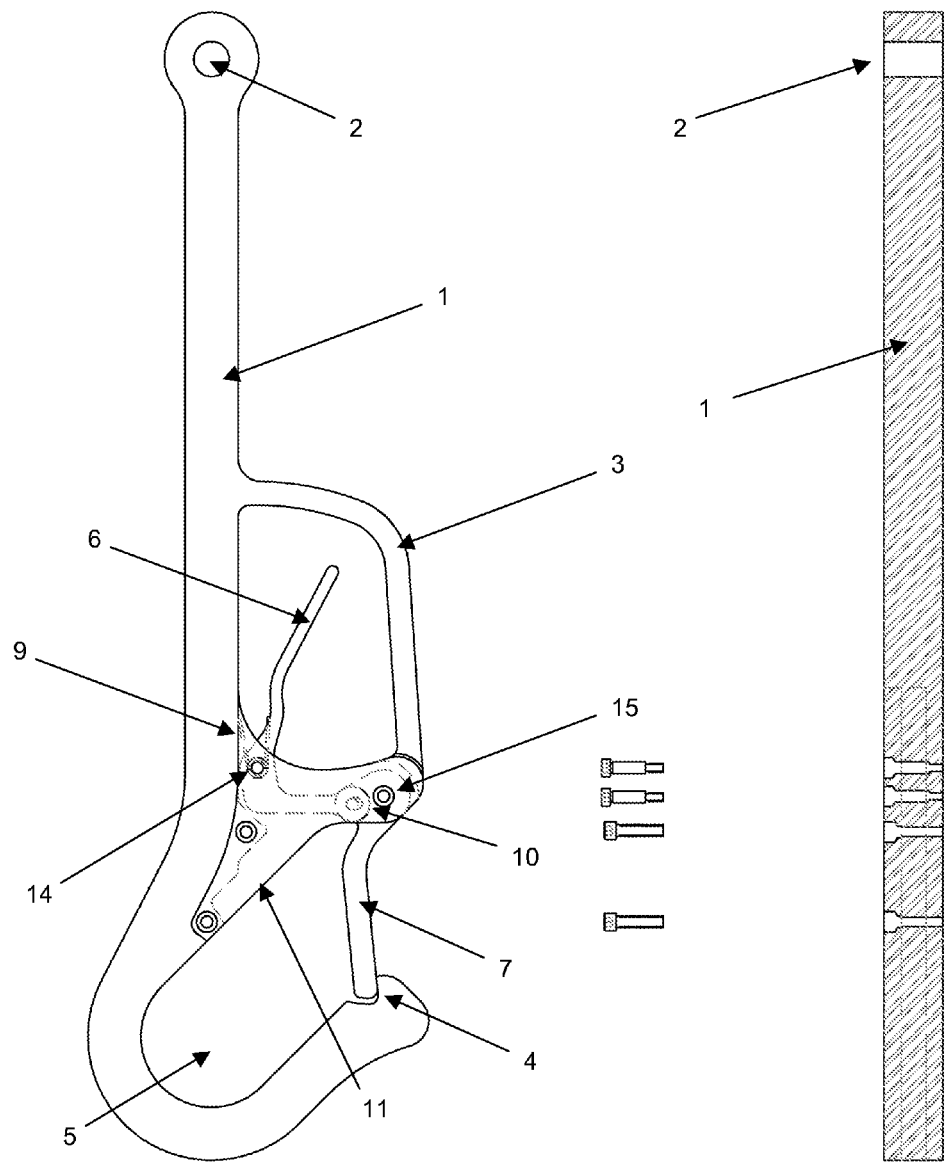
FIG. 8 is a side and back depiction of the safety latching lifting hook design further illustrating the latching mechanism in accordance with embodiments of the disclosure.

Reference is now made to FIG. 8 which shows a side and back depiction of the safety latching lifting hook design further illustrating the latching mechanism. The safety latching mechanism allows the user to quickly hook and unhook the lifting hook in a safe manner. The spring loaded latching mechanism allows the safety latching hook to easily secure the pipe into the hook area 5. The spring loaded latching mechanism allows the pipe to be loaded (hooked) into the hook area 5 without having to depress the trigger 6. After loading the pipe, the spring loaded latch 7 rests against the hook stop 4, keeping the pipe secure within the hook area 5. The pipe can only be released form the hook area 5 by depressing the trigger 6. This feature provides additional safety. Depressing the trigger 6 retracts the latch 7 from its closed position to its open position, which allows the pipe to be released from the hook area 5. The trigger 6 has a trigger pivot point 14 where the spring 9 is attached. The trigger 6 rotates about the trigger pivot point 14 which is a fixed point on the safety latching lifting hook. The latch 7 has a latch pivot point 15. The latch 7 rotates about the latch pivot point 15 which is a fixed point on the safety latching lifting hook. The trigger 6 and latch 7 are connected together by the pivot pin 10.

Figure 9:
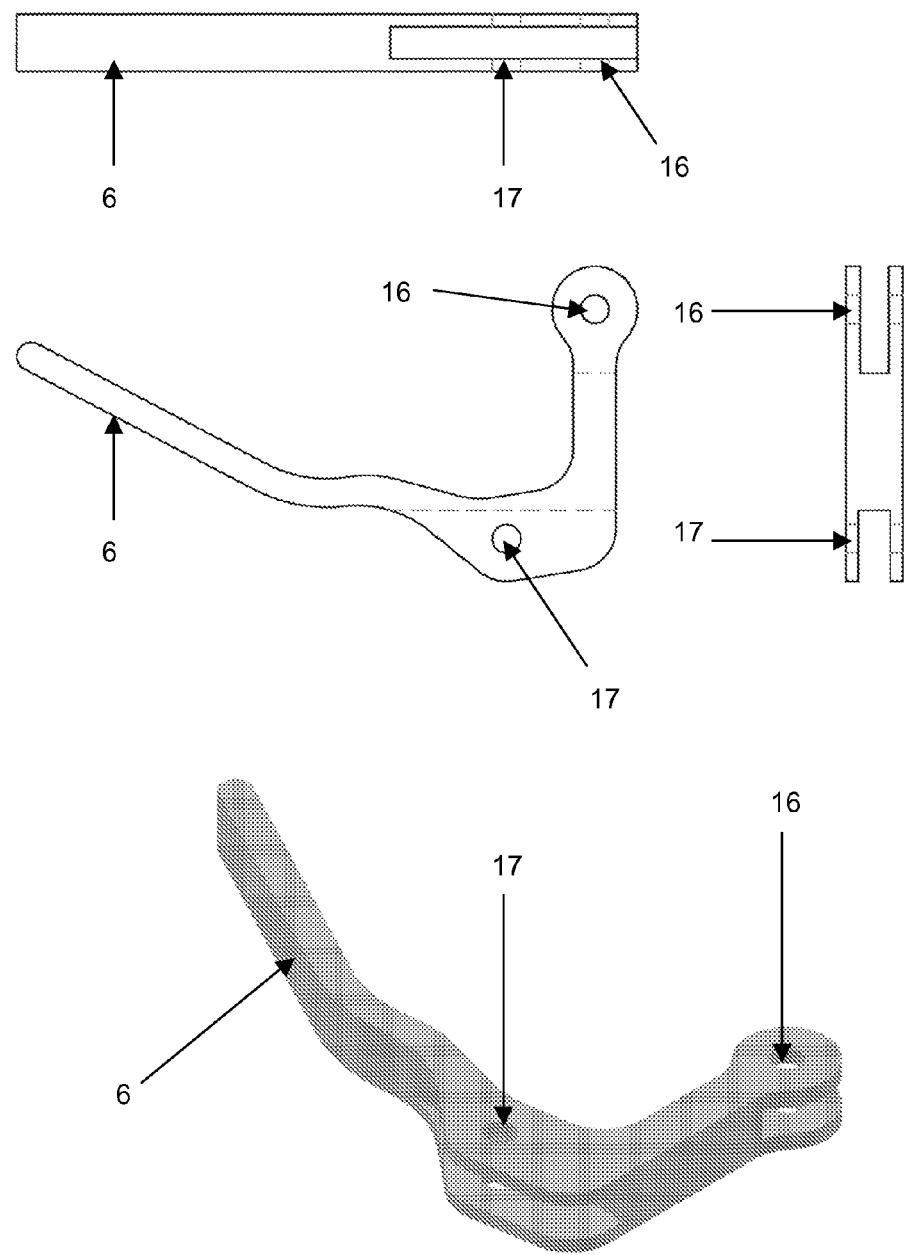
FIG. 9 is a top, front, side, and perspective view of the trigger for the safety latching lifting hook design in accordance with embodiments of the disclosure.

Reference is next made to FIG. 9 which shows a top, front, side, and perspective view of the trigger 6 for the safety latching lifting hook design. In these views illustrated is the trigger pivot point hole 17 in which a bolt or pin passes through and the trigger pivot pin hole 16 where another bolt or pin passes through.

Figure 10:
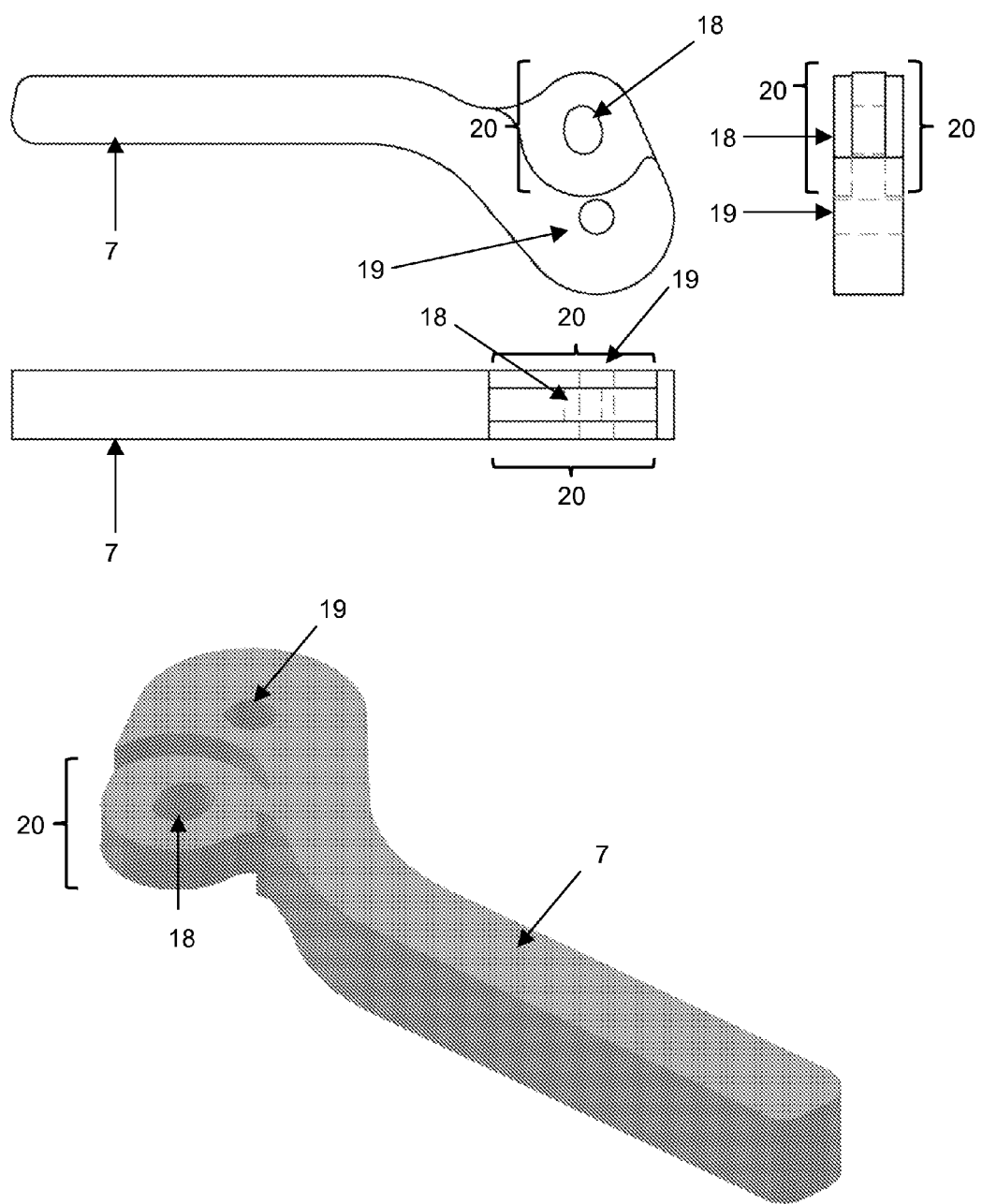
FIG. 10 is a top, front, side, and perspective view of the latch for the safety latching lifting hook design in accordance with embodiments of the disclosure.

Reference is now made to FIG. 10 which shows a top, front, side, and perspective view of the latch 7 for the safety latching lifting hook design. In these views illustrated is the latch pivot pin hole 19 in which a bolt or pin passes through and the latch pivot pin hole 18 where another bolt or pin passes through. In these views the slotted pivot pin pocket 20 can be seen. This slotted pivot pin pocket 20 is designed to allow the trigger 6 and latch 7 to smoothly work together and is designed to incorporate the full range of motion for the trigger 6 and latch 7 mechanism. The slotted pivot pin pocket 20 allows the trigger 6 to seat onto the latch 7 securely.

Figure 11:
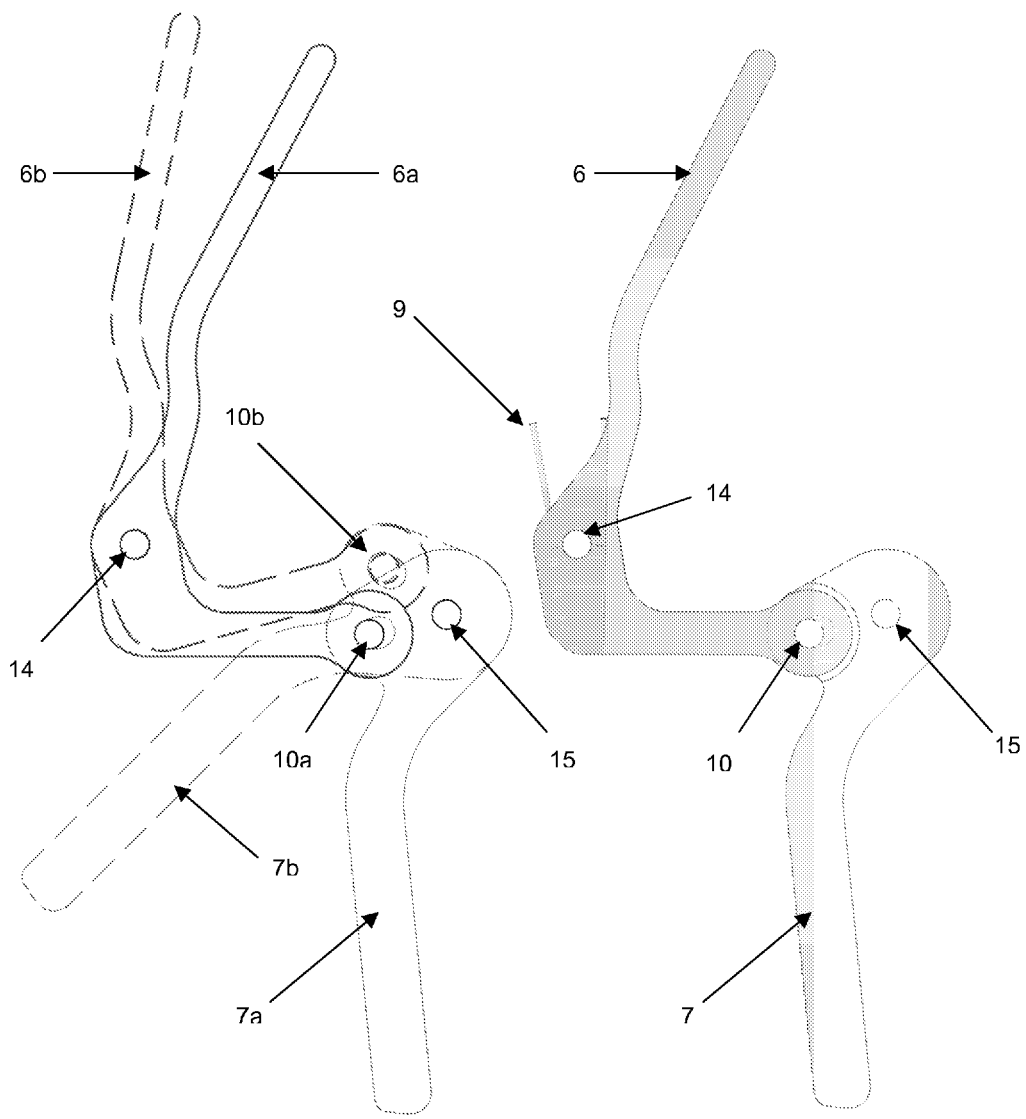
FIG. 11 is a side view of the trigger and latch safety mechanism for the safety latching lifting hook design in accordance with embodiments of the disclosure.

Reference is lastly made to FIG. 11 which shows a side view of the trigger and latch safety mechanism for the safety latching lifting hook design. In this illustration the trigger 6 is shown seated on the latch 7. The left figure subset illustrates the movement of the components when the trigger 6 is depressed. Both the trigger pivot point 14 and the latch pivot point 15 remain fixed when the trigger 6 is depressed to bring the latch 7 in. The trigger 6 is shown prior to being depressed 6a and after depressing the trigger 6b. Likewise, the latch 7 is shown prior to the trigger 6 being depressed 7a and after the trigger 6 is depressed 7b. Lastly, the pivot pin 10 is shown prior to the trigger 6 being depressed 10a and after the trigger 6 has been depressed 10b. The pivot pin 10 does not maintain a fixed position but allows the trigger 6 and latch 7 to rotate together smoothly.

The disclosed mechanical hook device is generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a," "an," and "the" are not intended to refer to only a singular entity, but include the general class of which a specific example may be used for illustration. The terminology herein is used to describe specific embodiments of the invention, but their usage does not delimit the disclosed method, except as may be outlined in the claims.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific features of the invention described herein. Such equivalents are considered to be within the scope of this invention and are covered by the claims.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

All of the mechanical devices disclosed and claimed herein can be made and executed without undue experimentation in light of the present disclosure. While the mechanical device has been described in terms of preferred embodiments, it will be apparent to those skilled in the art that variations may be applied to the invention described herein without departing from the concept, spirit, and scope of the invention.

More specifically, it will be apparent that certain components which are both related by material and function may be substituted for the components described herein while the same or similar results would be achieved. All such similar substitutes and modifications apparent to those skilled in the art are deemed to be within the spirit, scope, and concept of the invention as defined by the appended claims.

What is claimed is:

1. A hook assembly which comprises:

a main body having at least a front side and a back side with a portion of said main body forming a hook area, a hook stop, and a latch recess pocket;

a trigger attached to said main body at a trigger pivot point whereby said trigger rotates about said trigger pivot point and when said trigger is depressed it is depressed towards said main body and said trigger is located on the front side of said main body;

a latch attached to said main body at a latch pivot point whereby said latch rotates about said latch pivot point and said latch is located on the front side of said main body; and said trigger and said latch are connected by a pivot pin allowing said latch to rotate by the movement of said trigger and said trigger and said latch rotate about their respective said pivot points in opposite directions and when said trigger is fully depressed said latch retracts fully into said latch recess pocket allowing a pipe, chain, tie down point, or cable to be loaded or hooked into said hook area, or to be released or unhooked from said hook area; and a trigger guard which protects said trigger and operator's hand, whereby said trigger guard runs the length of said trigger, and is connected to said main body on the front side of said main body, and is of sufficient size to protect said operator's hand.

2. A hook assembly according to claim 1, wherein said latch is held against said hook stop by a torsion spring which keeps the pipe, chain, tie down point, or cable secured in said hook area.

3. A hook assembly according to claim 2, wherein said latch is allowed to be retracted by either depressing said trigger or allowing the pipe, chain, tie down point, or cable to be forced into said hook area by overcoming the opposing force of said torsion spring.

4. A hook assembly according to claim 3, wherein said assembly also comprises means for locking said trigger by restricting movement of said trigger at its end opposite of trigger pivot point.

5. A hook assembly according to claim 2, wherein said assembly also comprises means for locking said trigger by restricting movement of said trigger at its end opposite of said trigger pivot point.

6. A hook assembly according to claim 1, wherein said assembly also comprises means for locking said trigger by restricting movement of said trigger at its end opposite of said trigger pivot point.

7. A hook assembly according to claim 1, wherein said trigger pivot point and said latch pivot point are fixed relative to said main body.

8. A hook assembly according to claim 1, wherein said latch further comprises a slotted pivot pin pocket at the pivot pin allowing said trigger to sit onto said latch.

9. A hook assembly according to claim 1, wherein said trigger pivot point and said pivot pin reside on the same end of said trigger.

* * * * *